United States Patent [19]

Fitch et al.

[11] 4,159,682
[45] Jul. 3, 1979

[54] FLUID BED COMBUSTION WITH PREDRYING OF MOIST FEED USING BED SAND

[75] Inventors: Elliot B. Fitch, Pittsburgh, Pa.; Orris E. Albertson, Salt Lake City, Utah

[73] Assignee: Dorr-Oliver Incorporated, Stamford, Conn.

[21] Appl. No.: 856,379

[22] Filed: Dec. 1, 1977

[51] Int. Cl.² .............................................. F23G 5/04
[52] U.S. Cl. .................................... 110/245; 110/216; 110/346
[58] Field of Search ................ 110/215, 216, 243–245, 110/254, 346, 224, 226, 104, 105; 432/15, 58

[56] References Cited

U.S. PATENT DOCUMENTS

| | | | |
|---|---|---|---|
| 3,306,236 | 2/1967 | Campbell | 110/216 |
| 3,763,830 | 10/1973 | Robinson et al. | 110/215 |
| 3,815,522 | 6/1974 | Langer | 110/224 |
| 3,907,674 | 9/1975 | Roberts et al. | 110/245 |
| 3,915,657 | 10/1975 | Staffin et al. | 110/245 |

Primary Examiner—Henry C. Yuen
Attorney, Agent, or Firm—Harold M. Snyder; Burtsell J. Kearns

[57] ABSTRACT

Moist combustible matter is burned in a fluid bed reactor following a drying treatment in which the combustible matter is brought into contact with hot sand circulated from the fluid bed reactor. The water in the combustible matter is evaporated at a relatively low temperature in the drying treatment, thereby conserving heat in the system. The exhaust vapor from the drying treatment is handled separately from the reactor exhaust gases to condense the vapor therein before subjecting the remaining gas to odor-destroying high temperature.

33 Claims, 4 Drawing Figures

FLUID BED COMBUSTION WITH PREDRYING OF MOIST FEED USING BED SAND

This invention is directed to a process and system for burning moist combustible matter.

Fluid bed reactors are useful in many combustion reactions including incineration of combustible waste and production of heat for power generation and for process heat.

Incineration has for its purpose the complete destruction of the organic matter in the waste feed stream, leaving as a residue only an inert ash, and the performance of this combustion reaction in a manner which does not produce objectionable odors. Odorless combustion is achieved by complete oxidation of the organic matter in the waste feed stream and requires, as a practical matter, temperatures at least in the range from about 700° C. to about 800° C. depending upon the percent of excess air.

Fluid bed reactors have found application as incinerators for burning organic waste sludges and there are numerous installations of this type in operation. While it has always been desirable to minimize the fuel consumption of such units, this has become of increasing concern with the recent scarcity and high cost of fuel. In this connection, it is desirable to evaporate the water associated with the organic waste sludges in the most economical manner possible. Feeding the waste sludge directly into the incinerator causes evaporation of the water at the unnecessarily high temperature of 700° C. or more and results in a substantial waste of fuel.

Fluid bed reactors burning a fuel such as peat, may also be employed to generate steam for power by providing steam coils in the freeboard and/or wall regions or within the fluidized bed itself. The heat generated in such a unit may also be used to supply the heat required to carry out certain processes, including chemical processes.

It has been suggested that the excess heat in the exhaust gases might be transferred indirectly therefrom to the incoming moist feed, distilling off the water and leaving a residue of dry solids for combustion. However, this procedure offers very real difficulties both in the area of heat transfer and materials handling. This alternative is not commercially attractive.

Of course, sensible heat from the exhaust gases can be transferred to the incoming combustion air. This is, as a matter of fact, commonly done, but is only a partial answer to the problem. The quantity of exhaust gases is much larger than that of the incoming air, because of the very large amount of water vapor that the exhaust gases contain. Even with perfect heat transfer, the incoming air would be able to take up and thus recuperate only a fraction of the sensible heat in the discharge gases from the combustion reactor.

There is thus a very real need for a combustion system that will operate efficiently with a moist combustible feed and for an incinerating system which can effectively destroy high-moisture containing organic waste sludges, yet hold fuel consumption to as low a level as possible.

Accordingly, it is an object of the invention to provide an improved, economical method and system for drying a moist, combustible feed prior to introduction into a fluidized bed combustion reactor.

It is a further object of the present invention to provide a process and system for drying a moist combustible feed using heat from a subsequent incineration step to evaporate water at a relatively low temperature.

Still another object of the invention to provide a combustion system in which the heat present in the hot bed sand of a fluidized bed reactor is employed to dry a moist combustible feed.

Other objects and advantages will become apparent from the following description taken in conjunction with the accompanying drawings in which.

Figure 1:
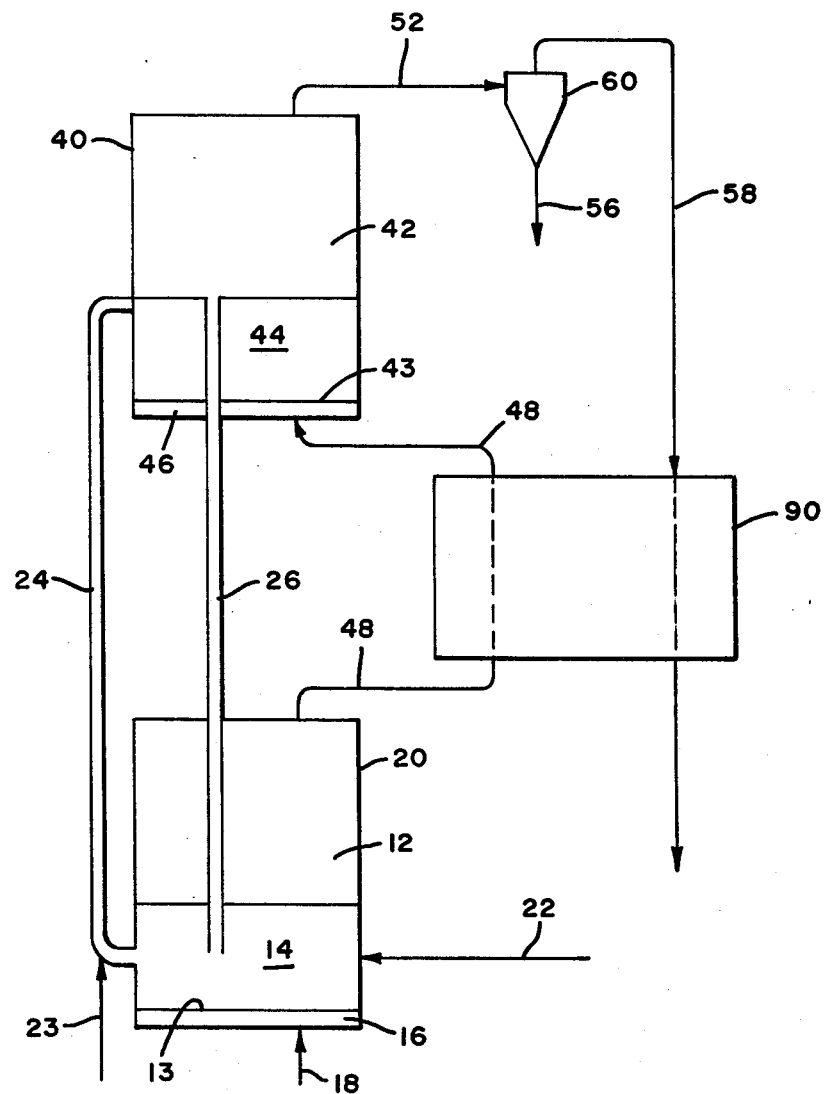
FIG. 1 is a schematic diagram of a simplified combustion system.

Generally speaking, the present invention involves fluidized bed combustion of a moist feed such as peat, sawdust, hog fuel and sewage or industrial sludge. In this process the hot, inert particulate bed material of the fluidized combustion bed; e.g., sand, is removed from the bed, brought into drying contact in a drying zone with the moist feed to vaporize the water at relatively low temperature, and then is returned to the fluidized bed with dried feed; the inert bed particles for reheating and the dried feed for combustion. In carrying out this process, the water vapor is condensed in a condensation zone from the low temperature off-gases of the drying step and removed as liquid. Any remaining non-condensible gases are conducted as fluidizing gas to the fluidized combustion bed where they are heated to a temperature of at least 700° C. thereby eliminating any odor.

The drying of the moist feed, as described, may be carried out in a number of different devices capable of bringing the hot sand into contact with the feed and generally providing a confined volume. One such device is a pug mill; another is a rotating drum; a third is a simple covered mixing tank provided with stirring or agitating means. A fluidized bed has also been found to function quite well for drying the moist feed and is, in fact, the preferred apparatus for carrying out the process.

The moist feed may consist, as a practical matter, of from about 5% up to about 50% or more of solids. Sewage sludge will usually fall in the lower portion of this range, perhaps up to 30% solids, and a material such as hog fuel may be in the range of 50% or more of solids.

More specifically, then, two fluidized beds may be employed to carry out the combustion process of the invention; one for drying the moist feed, while in the other bed, the dried feed is burned. The combustion bed operates at a relatively high temperature, say 700° C. or more, while the drying bed operates at a substantially lower temperature, say in the range from 80° to 180° C. The heat necessary to perform the evaporation function in the fluidized drying bed is supplied by transferring a portion of the inert bed material from the combustion bed to the drying bed. The inert bed material from the combustion bed enters the drying bed at a relatively high temperature, but is almost immediately cooled to a temperature of, say 125° C., by the rapid heat transfer in the drying bed, which is also receiving moist feed introduced at ambient temperature. Evaporation of water from the moist feed is efficiently carried out at this relatively low temperature with the exhaust gases and vapor from the dryer unit leaving at a temperature of about 125° C. The exhaust gases from the drying bed are conducted through a scrubber-cooler to condense the water vapor and the remaining non-condensible gas and air are forwarded to the fluidizing blower for introduction into the combustion bed so they are subjected to the high temperature therein for elimination of odors.

It should be understood that the drying bed and combustion bed are entities which may be located within a single reactor shell or, alternatively, each bed may be housed in its own reactor shell.

Referring now to FIG. 1, certain important features of this novel combustion system, as applied in the incineration of sewage sludge, are illustrated in the form of a simplified schematic diagram. The three principal units of the system which are shown in FIG. 1 are a fluid bed incinerator 40, a heat exchanger 90 and a fluid bed drying unit 20. A cyclone 60 is also shown for removing solids from the exhaust gases of the incinerator 40. In operation, a moist organic sludge is introduced through line 22 into a fluidized bed of sand 14 in the drying chamber 12 of the drying unit 20. A constriction plate 13 separates the wind box 16 in the lower portion of the drying unit 20 from the drying chamber 12. Air is introduced into the wind box 16 through line 18 and traverses constriction plate 13 to fluidize the inert bed material; e.g. sand, of the bed 14. The sludge entering the fluidized bed is quickly raised to bed temperature which is about 125° C. and the moisture in the sludge is evaporated; the fluidizing air becomes well moisturized in passing through bed 14 and is exhausted from the drying unit 20 through the conduit 48 leading to the heat exchanger 90. The dried sludge together with some bed sand, is removed from the drying unit 20 through the conduit 24 which is connected between the drying unit 20 and the incinerator 40. An air line 23 is provided for the purpose of introducing air into the conduit 24 as a conveying or lifting means for the dried sludge and sand moving through conduit 24. The incinerator unit 40 has a combustion chamber 42 which is separated from a wind box 46 by the constriction plate 43. A fluidized bed 44 comprising an inert particulate material, such as sand, is supported by the constriction plate 43. Fluidizing air is supplied to the wind box 46 by the conduit 48. This fluidizing air has traversed heat exchanger 90 and been thereby heated to an elevated temperature in the range of 350° C. to 550° C. It will be understood that the temperature within the incinerator 40 is substantially higher than that within the drying unit 20 and fuel, such as fuel oil, may be injected into the fluidized bed through means (not shown) to maintain a desired temperature in the fluidized bed. The bed temperature within fluidized bed 44 of incinerator 40 may be, for example, 700° C., and sand from this bed is conveyed to the drying unit 20 by the conduit 26. This conduit is shown as an overflow type, extending vertically into bed 44, in which the sand simply overflows the upper lip of the conduit and falls under the influence of gravity through conduit 26, emerging at the lower end of conduit 26 well below the upper surface of bed 14 of the drying unit 20. A suitable valve, for example, of the slide or cone valve type, may be provided in conduit 26 to control the quantity of sand supplied to the drying unit. The exhaust gases from incinerator unit 40 are conducted away through exhaust conduit 52 which is connected to cyclone 60. In cyclone 60 the solids (ash) are separated from the gases and exit for disposal through line 56. The hot gases leave cyclone 60 through line 58 which conducts the gases to heat exchanger 90. In the heat exchanger 90, the heat in the exhaust gases is recuperated by heat exchange with the gases from the drying unit 20 as they pass through the heat exchanger 90 enroute to the incinerator unit 40. As shown in FIG. 1, all of the gas from the drying unit 20 is heated in the heat exchanger 90. This is a wasteful procedure because much of the volume of this gas is the moisture evaporated from the sludge in the drying unit 20 and heating this vapor is not beneficial. The system shown in FIG. 2 remedies this defect of the simplified system shown in FIG. 1.

Figure 2:
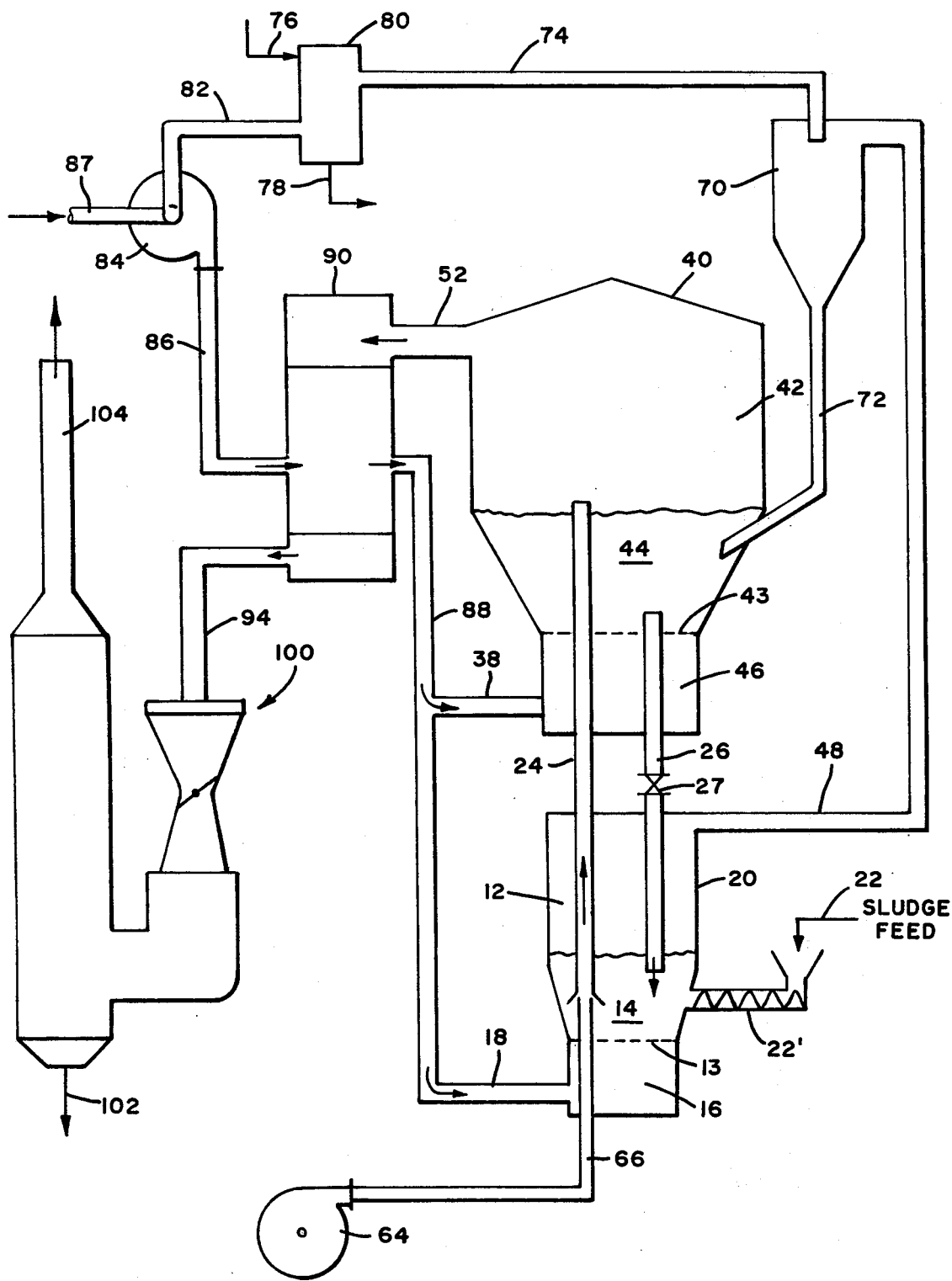
FIG. 2 is a schematic diagram of an incineration system in accordance with the invention.

In FIG. 2, a system is shown in which the major units are designated by the same numerals as those employed in FIG. 1. Thus, there is illustrated the drying unit 20, the incinerating unit 40, and the heat exchanger 90. In addition, a scrubber cooler 80, a cyclone 70 and a venturi scrubber 100 are also illustrated. In this system, moist organic sludge is introduced through line 22 and screw feeder 22' into the fluidized bed 14 of the fluid bed dryer 20. The fluidized bed 14 is maintained in a fluidized state by the introduction of fluidizing air by means of conduit 18 into wind box 16; air from the wind box traversing the constriction plate 13 to effect fluidization. Hot bed sand is introduced from the incinerator 40 through the conduit 26 which terminates below the top surface of the fluid bed 14 of the drying unit 20.

The fluidizing air becomes highly moisturized in the drying bed 14 and exits from the drying chamber 12 through line 48 which communicates with cyclone 70. In the cyclone 70, the solids in the exhaust gases from the dryer unit are separated and descend to the incinerator unit 40 through line 72. The gases, free from entrained solids, are conducted by means of conduit 74 to scrubber-cooler 80 which provides a closed chamber and may be of the tray cooler or spray cooler type. Cooling water is introduced into the scrubber-cooler through line 76 and this scrubber water condenses the moisture in the exhaust gases. The condensed moisture exits the scrubber-cooler with the scrubber water through conduit 78. The scrubbed gas is forwarded through conduit 82 to fluidizing blower 84 where, combined with air introduced through air in-take 87, it is conducted to the incinerator and dryer units through the heat exchanger 90. In the heat exchanger 90, the fluidizing air is pre-heated by heat exchange with the exhaust gases from the incinerating unit 40 and then moves through conduits 88 and 38 to the incinerating unit 40. The fluidizing gases enter the incinerating unit 40 through the wind box 46 and traverse the constriction plate 43 to fluidize the fluid bed 44 which rests on the constriction plate 43. The fluid bed in the incinerating unit is at a temperature of about 700° C. which is sufficient to completely destroy the organic matter in the dried sludge by oxidation.

The dried sludge, together with inert bed material, is air-lifted into incinerating bed 44 from the fluid bed 14 of the dryer unit 20. The air-lifting apparatus comprises an air blower 64, a conduit 66 connected to the blower 64 and terminating in the fluid bed 14 and a transfer pipe 24 extending from bed 14 to bed 44. Conduit 66 discharges air into the lower open end of transfer pipe 24. Air, in passing from conduit 66 to transfer pipe 24, picks up dried sludge and inert bed particles and lifts them into incinerating bed 44. It will be understood that the inert bed material arrives in the incinerator unit 40 at a temperature of about 125° C. and is almost instantaneously heated to the bed temperature of about 700° C. Inert bed material from the incinerating unit 40 is, at the same time, being removed from the fluid bed 44 for dispatch through transfer pipe 26 to the fluid bed 14 of the dryer unit 20. This inert bed material from the incinerating unit 40 is at a temperature of about 700° C.; the temperature of the fluidized bed 44. All gases which exit from the combustion chamber 42 of the incinerating unit 40 through conduit 52 have been exposed to a temperature of at least 700° C. which is sufficient to effect complete deodorization of the gases. If desired, a cyclone (not shown) may be inserted in the exhaust gas conduit 52 to separate solid particulate material from the exhaust gases (for removal from the system) prior to introduction of the gases into the heat exchanger unit 90. The venturi-scrubber 100 which reveives the exhaust gases from the heat exchanger 90 through conduit 94 is of conventional design. The scrubber removes solids from the exhaust gases and discharges them along with the scrubber water through line 102 while the exhaust gases are discharged through stack 104 into the atmosphere at about 160° F.

In the embodiments disclosed in FIGS. 1 and 2, the incinerating unit is positioned above the drying unit. The bed sand and dried sludge from the drying unit is lifted by an air lift or perhaps by mechanical means, such as a bucket lift, while the hot inert bed material falls under the influence of gravity through a valve-controlled conduit. Since the incinerating unit is much the larger of the two fluid bed reactors it may well be advantageous to mount the drying unit above the incinerating unit. When this arrangement is adopted, the dried sludge and inert bed material from the drying unit fall under the influence of gravity through a conduit into the fluid bed reactor while the hot bed material may be lifted in an air lift or by mechanical means from the fluid bed incinerator to the drying unit.

Figure 3:
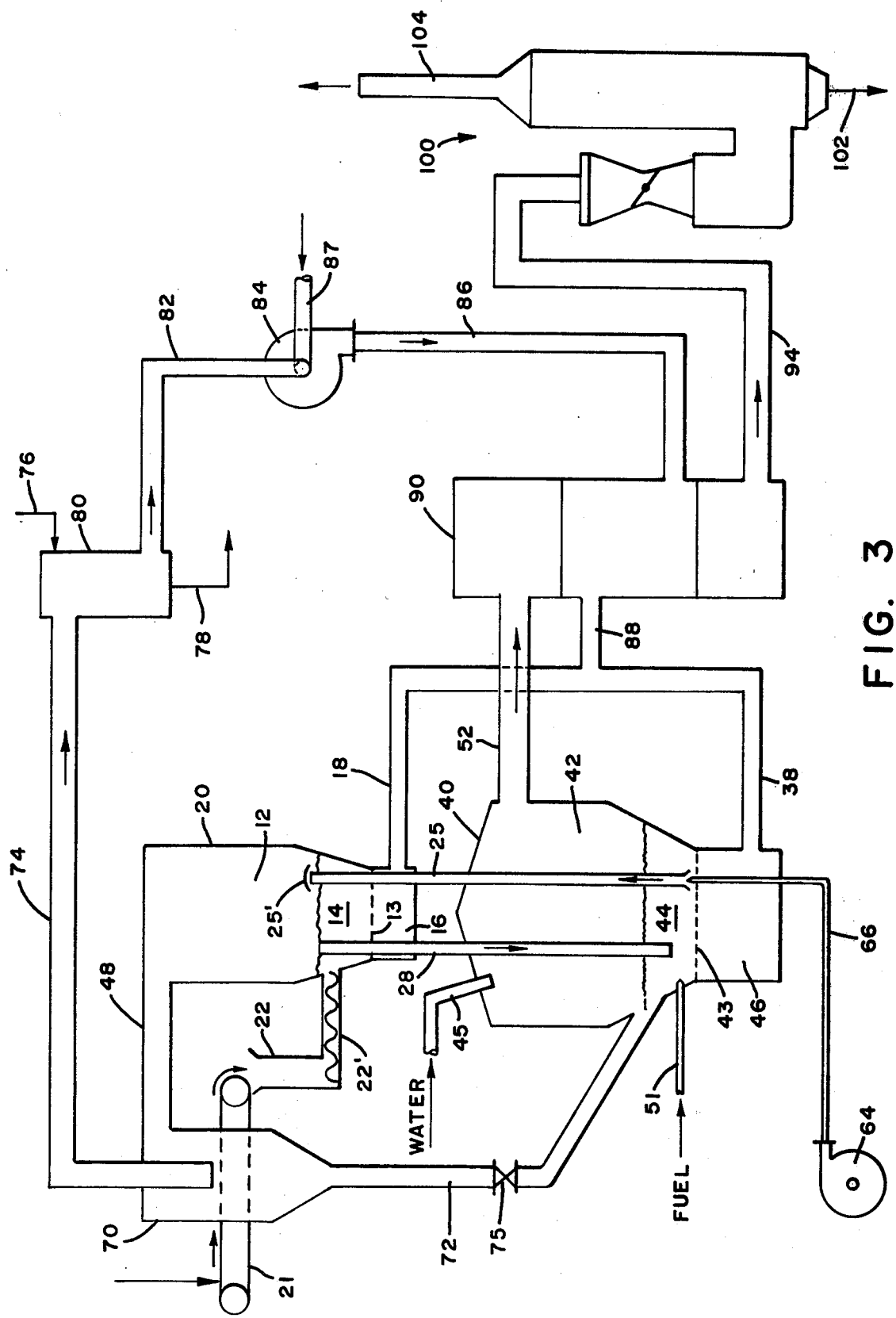
FIG. 3 is a schematic diagram of an alternative configuration for the system of the invention.

Such a system is shown in FIG. 3, which is a schematic diagram of a modified system in which the incinerator is positioned below the dryer unit, rather than above it, as in the arrangement of FIG. 2, previously described. Since the dryer unit is substantially smaller than the incinerator unit certain economies can be effected in construction, particularly with respect to supporting structure for the units.

In this modified system, moist sludge is fed by a belt conveyor 21 to a screw feeder 22 which forces the sludge into the dryer unit 20 below the upper surface of the fluidized bed 14. Preheated air is introduced into the wind box 16 of the dryer unit 20 from line 18 and this air passes the constriction plate 13 to fluidize the bed 14 in dryer chamber 12 and then, with the moisture evaporated from the sewage sludge, passes into the freeboard region of dryer chamber 12. Inert bed material and dried sludge flow over the upper end of transfer pipe 28, thus falling into incinerator unit 40. Hot bed sand is air-lifted into the dryer unit 20 through transfer pipe 25 which extends from the fluid bed 44 of incinerator unit 40 into the bed 14 of the dryer unit. A blower 64 and a conduit 66 cooperate with the transfer pipe 25 to provide the air-lift system. The conduit 66 discharges into the open lower end of transfer pipe 25 creating a venturii effect which draws hot particulate bed material into transfer pipe 25 for delivery into bed 14. The upper end of transfer pipe 25 may be provided with a baffle plate 25′ to deflect the hot particulate material onto the bed 14. The gases in the dryer chamber 12 exit through conduit 48 which leads into the cyclone 70 wherein the solids are separated from the gas and vapor, with solids being returned to the incinerator 40 through the valved conduit 72. Valve 75 in conduit 72 may be of the trickle valve type. The gas and vapor present in the cyclone exit through conduit 74 and are forwarded to the scrubber-cooler 80. In the scrubber-cooler 80, water, supplied through line 76, condenses the vapor in the gases. The liquid from the scrubber-cooler leaves this unit through conduit 78 and may be returned to the head of the sewage plant. Sewage may be substituted for the water in the scrubber-cooler, if desired, to reduce the total amount of liquids which must be handled by the plant. The gases, now saturated with moisture at, say, 35° C., leave the scrubber-cooler 80 through conduit 82 which conducts the gases to the fluidizing blower 84, where this gas is combined with additional air introduced through air in-take 87 and forwarded to the incinerator and dryer units through heat exchanger 90 via conduit 86.

The incinerator 40 receives its charge of solids through the aforementioned transfer pipe 28 through which both sand and dry sludge are introduced into fluid bed 44. In addition, as previously mentioned, particulate dry solids are supplied to the fluid bed 44 from the cyclone 70 through the conduit 72, these latter being the solids removed from the off-gases of the fluid bed dryer 20. Some loss of bed sand occurs in operation and the sand inventory may be replenished from time to time by introducing sand into bed 44 through the inclined portion of conduit 72 or through separate charge means (not shown). Fuel is supplied to the bed 44 by one or more fuel guns 51 which penetrate the sidewall of the fluid bed incinerator 40 to delivery fuel directly into the fluidized bed 44. It is contemplated that fuel oil injection will not be required under usual operating conditions, but such fuel injection may be required from time to time when the fuel value supplied by the dry sludge is not sufficient to sustain autogenous combustion. Preheated fluidizing gas is supplied to the wind box 46 of incinerator unit 40 through the conduit 38. This gas passes through the constriction plate 43 to fluidize bed 44.

For purposes of temperature control, water may be injected into the combustion chamber 42 of the incinerator unit 40 through conduit 45. Combustion of the dried sewage sludge occurs primarily within fluidized bed 44 where the temperature is about 700° C., but combustion of sludge particles ejected from the bed and of combustible gases occurs to a certain extent above the bed level in combustion chamber 42, where the temperature may be expected to reach the level of about 815° C. The exhaust gases from the combustion chamber 42 leave the chamber through conduit 52 and then traverse the heat exchanger 90. The exhaust gases after this heat exchange with the incoming fluidizing air leave the heat exchanger through conduit 94 and are then conducted to the venturi scrubber 100 which is of essentially conventional design. Gases leave the scrubber through the exhaust stack 104 while the liquids and solids leave the scrubber through conduit 102. It will be noted that the gases having their origin in the fluid bed drying unit 20 appear at the fluidizing blower 84 for mixture with incoming combustion air, admitted by air in-take 87, and these gases are forwarded through conduit 86 to the heat exchanger 90, where they are heated to a suitable temperature, say 480° C. The pre-heated gases leave the heat exchanger through a conduit 88 and the flow is then split between conduits 38 and 18 for supply of pre-heated air to the wind boxes 46 and 16 of the fluid bed incinerator 40 and drying unit 20, respectively. The odorous gases from the fluid bed dryer 20 are thus subjected to the high temperature prevailing in the combustion chamber 42 of incinerator unit 40 and the odors so destroyed.

Figure 4:
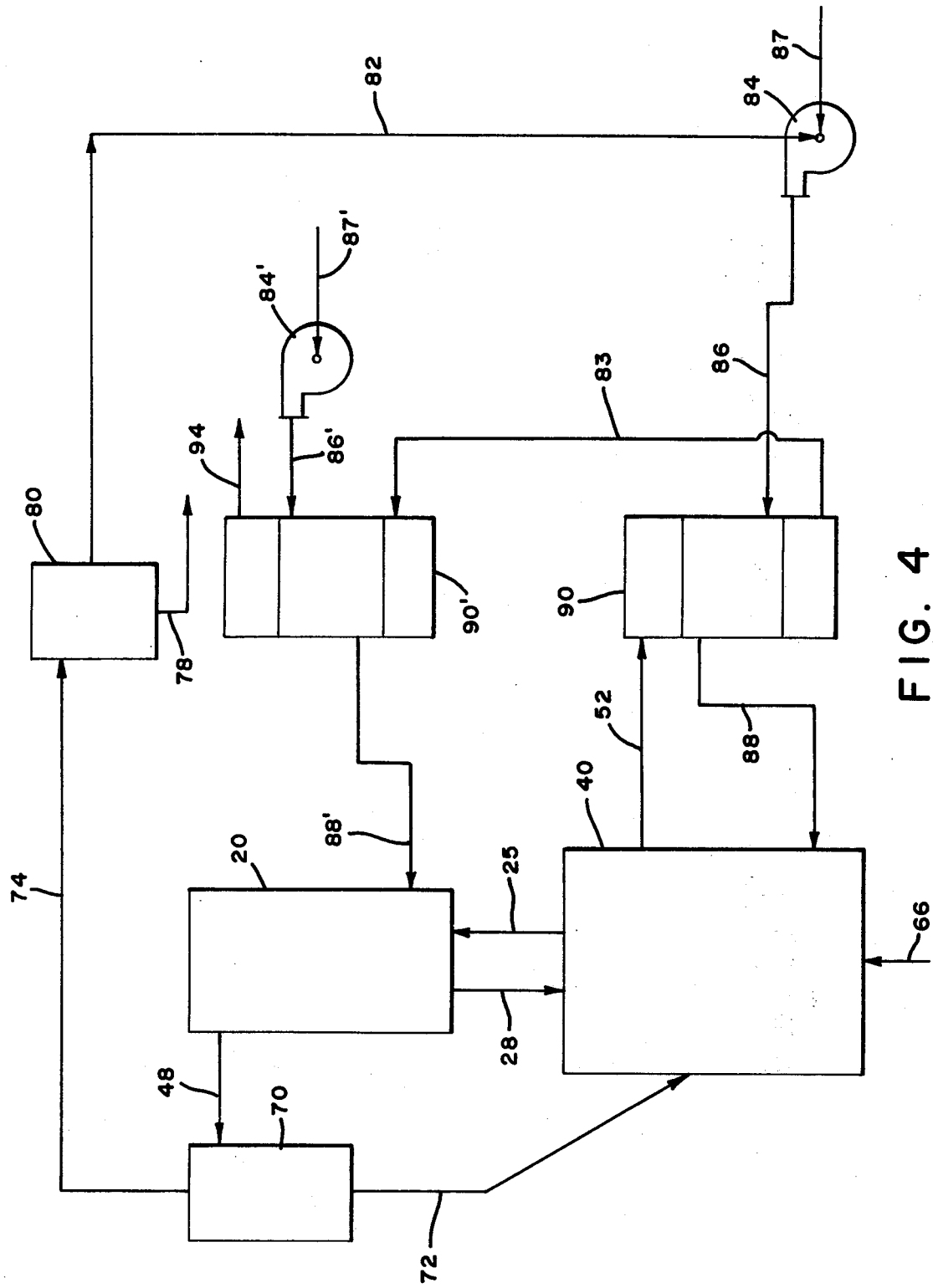
FIG. 4 is a schematic diagram of a further embodiment of the invention.

The embodiment of the invention shown in FIG. 4 calls for separate fluidizing blowers 84 and 84' for the combustion reactor 40 and the fluidized bed dryer unit 20, respectively. This system avoids the complexities which arise in controlling the apportionment of air flow to the incinerator and dryer unit from a single blower. The separate blowers of FIG. 4 are individually regulated to provide the desired air flows, a substantial control simplification. Blower 84 directs a flow of air through conduit 86, a first heat exchanger 90 and conduit 88 into the windbox of reactor 40. Blower 84' directs a flow of air through conduit 86', a second heat exchanger 90' and conduit 88' to the windbox of the fluid bed dryer unit 20. Hot exhaust gas from reactor 40 is routed through exhaust conduit 52 to traverse first heat exchanger 90 and then, via conduit 83, second heat exchanger 90'. Conduit 94 is provided to accomodate the exhaust gases from second heat exchanger 90' and convey them to further treatment stations, as required, and ultimately to the exhaust stack. The hot exhaust gases thus first preheat the fluidizing air for the combustion reactor and then preheat the fluidizing air for the dryer unit. In this way, the combustion reactor receives preheated fluidizing air at a relatively high temperature, whereas the dryer unit receives preheated air at a lower, but adequate, temperature. The solids and gas flows in the rest of the system are essentially the same as those described in connection with FIG. 3 with the same reference characters applied to the several elements of the system.

Considering the dryer unit alone, it is clear that furnishing air to the dryer may not be necessary where fluidizing air is not required (where the dryer is a pug mill or rotating drum unit, for example). Very large volumes of vapor are created by contacting the moist feed with hot sand and this vapor will flow from the dryer unit under its own pressure, if an appropriate conduit is provided. With such a conduit connected to a condenser, most of the vapor will be condensed therein and can be drawn off and disposed of as liquid, the vapor remaining adjacent or associated with the feed under these circumstances is only a small fraction of the original moisture. Such a feed is effectively "dry."

The embodiments of the invention which have been illustrated all incorporate a heat exchanger for recuperating heat from the reactor exhaust gas to preheat the fluidizing air for the combustion reactor. A saving in capital cost, at some sacrifice in efficiency, can be effected by eliminating the heat exchanger. In this embodiment of the invention, air at ambient temperature is used as the fluidizing air and the reactor exhaust gas is routed directly to the venturi scrubber and exhaust stack.

While sand is the usual bed material, since it is quite inert and relatively inexpensive, other particulate bed materials, such as Al$_2$O$_3$ and MgO, may be employed in special circumstances.

In some cases it may be necessary or advantageous to use a mixed feed; for example, sewage and industrial sludge. The process of the invention readily accomodates such mixed feeds.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for combustion of moist combustible feed wherein said moist feed is first dried and then introduced into a fluidized bed of hot, inert, particulate material for combustion comprising, withdrawing a quantity of said hot particulate material from said fluidized bed, intimately contacting said moist feed with said hot particulate bed material to evaporate the water in the feed at a relatively low temperature, separating the dried solids from the gas stream containing the evaporated water, charging the separated dried feed and the particulate bed material associated therewith into said fluidized bed for combustion, treating the separated gas stream to remove and dispose of the water vapor therein and forwarding the balance of the separated gas stream for further use in the process.

2. The process of claim 1 wherein said separated gas stream is removed to a closed chamber wherein said water vapor generated by evaporation is condensed for disposal.

3. The process of claim 2 wherein any non-condensible gases associated with said water vapor are conducted from said closed chamber to said fluidized combustion bed to serve as at least part of the fluidizing gas therefor.

4. The process of claim 3 wherein the inert particulate material forming the fluidized bed is sand.

5. The process of claim 4 wherein the contact between said moist feed and said hot sand is effected in a confined volume and a flow of air is provided through said confined volume to remove said water vapor to said closed chamber for disposal.

6. The process of claim 3 wherein the contact between said moist feed and said hot particulate bed material is effected in a pug mill.

7. The process of claim 6 wherein a flow of sweep air is provided in said pug mill to remove said water vapor to said closed chamber for disposal.

8. The process of claim 7 wherein the fluidizing air for said fluidized bed is preheated by heat exchange with the exhaust gas from said reactor.

9. The process of claim 8 wherein said inert particulate material forming the fluidized incinerating bed is sand.

10. A sewage sludge incineration process in accordance with claim 8 wherein the condensation effected in said condensation zone is brought about by contacting the moist air with water in a tray scrubber.

11. The process of claim 3 wherein the contact between said moist feed and said hot particulate bed material is effected in a fluidized drying bed.

12. The process of claim 11 wherein a flow of air is provided for fluidizing said drying bed and removing said water vapor from the drying bed region to said closed chamber, and routing the air and other non-condensible gas from said drying bed to said fluidized combustion bed to serve as at least a part of the fluidizing gas therefor, whereby said air and other non-condensible gas is exposed to odor-destroying elevated temperature.

13. The process of claim 1 wherein said combustion is conducted at a temperature of at least 700° C. and said drying is carried out at a temperature of from about 80° C. up to about 180° C.

14. A process for incineration of moist organic sludge wherein said moist sludge is first dried and then introduced into a reactor having a fluidized bed therein of hot, inert, particulate material to heat the sludge to incineration temperatures, comprising, withdrawing a quantity of said hot, particulate material from the fluidized incinerating bed to a drying zone, introducing moist sludge into said drying zone for intimate contact with said hot, particulate bed material to effect drying of said sludge by evaporation of the water fraction, conducting the water vapor away from said drying zone, condensing the water vapor and disposing of the liquid formed, exposing any non-condensible gases present in said drying zone to the odor-destroying elevated temperatures in said reactor, and charging the dried sludge and a quantity of particulate bed material into said fluidized incinerating bed for combustion of said sludge and reheating of said particulate bed material.

15. The process of claim 14 wherein the contact in the drying zone between said moist sludge and said hot particulate bed material is accomplished in a pug mill and wherein any non-condensible gases remaining after condensation of said water vapor are conducted to said fluidized bed reactor to serve as at least part of the fluidizing gas therefor, whereby said non-condensible gases are subjected to odor-destroying elevated temperatures.

16. The process of claim 14 wherein the contact in said drying zone between said moist sludge and said hot particulate bed material is accomplished in a fluidized drying bed and wherein any non-condensible gases remaining after condensation of said water vapor are conducted to said fluidized bed reactor to serve as at least part of the fluidizing gas therefor, whereby said non-condensible gases are subjected to odor-destroying elevated temperatures.

17. The process of claim 14 wherein said incineration is conducted at a temperature of at least about 700° C. and said drying is carried out at a temperature in the range from about 80° C. up to about 180° C.

18. A sewage sludge incineration process wherein said sludge is first dried and then charged into a reactor having a fluidized incinerating bed of sand therein maintained at a temperature of at least 700° C. to effect substantially complete combustion of the sludge, comprising, withdrawing hot sand from said reactor and introducing said sand into a drying bed, said hot sand maintaining said drying bed at a temperature of from about 80° C. up to about 180° C., passing a substantial flow of air through said drying bed to effect fluidization thereof, charging sewage sludge into said fluidized drying bed for intimate contact with said hot sand and fluidizing air whereby said sewage sludge is dried and the air becomes well moisturized, removing said moisturized air from the vicinity of said drying bed to a condensation zone, condensing the water vapor present in the air in said condensation zone, removing the liquid produced thereby for disposal, introducing the air from said condensation zone into said reactor to serve as at least part of the fluidizing combustion air for said fluidized sand bed in said reactor, any odors present in said air being destroyed by exposure to the combustion temperatures, and exhausting the gases from said reactor.

19. The sewage sludge incineration process of claim 18 wherein the hot exhaust gases from said reactor are passed in heat exchange with said fluidizing combustion air to preheat same prior to introduction into said reactor.

20. The sewage sludge incineration process of claim 19 wherein the hot exhaust gases from said reactor are passed in heat exchange with said fluidizing air for said drying bed to preheat said air prior to introduction into said drying bed.

21. A combustion system for moist combustible feed comprising a fluidized bed reactor adapted to house a bed of inert particles, means for fluidizing said particle bed, an exhaust conduit connected to said reactor to conduct away reactor exhaust gases for ultimate discharge into the atmosphere, a dryer unit for drying moist feed prior to combustion, feed means connected to said dryer unit for introducing moist feed into said dryer unit, a first transfer means connecting said reactor and said dryer unit for withdrawing hot, inert, bed particles from said reactor and conveying said particles to said dryer unit, a second transfer means connecting said reactor and said dryer unit for withdrawing a mixture of dried feed and inert bed particles from said dryer unit and conveying said mixture to said reactor for combustion, a vapor conduit connected to said dryer unit for conveying water vapor from said dryer unit, a condenser connected to said vapor conduit to receive and condense said water vapor for disposal and means for conducting any non-condensible gas from said condenser to said reactor so that said non-condensible gas is subjected to the elevated temperature within said reactor.

22. The combustion system of claim 21 wherein said dryer unit is a pug mill.

23. The combustion system of claim 21 wherein said dryer unit is a rotary drum.

24. The combustion system of claim 21 wherein said dryer unit is an enclosed mixing tank having agitating means therein.

25. The combustion system of claim 21 wherein said dryer unit comprises a fluidized bed.

26. The combustion system of claim 21 wherein preheating means is provided for the fluidizing medium for said fluidized bed.

27. The combustion system of claim 25 wherein preheating means is provided for the fluidizing medium for said fluidized beds.

28. A system for incinerating sewage sludge comprising a fluidized bed incinerating reactor adapted to house a bed of inert particles, blower means for furnishing fluidizing air to said reactor, an exhaust conduit connected to said reactor to conduct away reactor exhaust gases for ultimate discharge into the atmosphere, a dryer unit for drying sewage sludge prior to incineration, feed means connected to said dryer unit for introducing moist sludge into said dryer unit, a first transfer means connecting said incinerating reactor and said dryer unit for withdrawing hot, inert, bed particles from said incinerating reactor and conveying said particles to said dryer unit, a second transfer means connecting said incinerating reactor and said dryer unit for withdrawing a mixture of dried sludge and inert bed particles from said dryer unit and conveying said mixture to said incinerating reactor, said blower means communicating with said dryer unit for providing a substantial air flow through said dryer unit for removal of moist air from said dryer unit, a vapor conduit connected to said dryer unit, a condenser connected to said vapor conduit to receive said moist air and remove water vapor therefrom for disposal, a heat exchanger, a gas conduit having said blower means therein connected between said condenser and said heat exchanger to conduct non-condensible gas from said condenser and air from said blower to said heat exchanger for preheating, conduit means connecting said exhaust conduit to said heat exchanger to furnish hot exhaust gases from said reactor prior to discharge into the atmosphere for heat exchange with said non-condensible gas from said condenser and said air from said blower, conduit means connecting said heat exchanger with said incinerating reactor to conduct the preheated air and non-condensible gas to said reactor for use as at least part of the fluidizing air.

29. The system of claim 28 wherein said inert bed particles are sand.

30. The system of claim 29 wherein said first transfer means is a vertical pipe open to both the incinerating bed and the dryer bed so that bed sand falls under the influence of gravity from the incinerating bed to said dryer bed and wherein said second transfer means is a vertical transfer pipe open to both the incinerating bed and the drying bed means for injecting a stream of air into the lower end of said second transfer means to air lift dried sludge and bed sand from said drying bed to said incinerating bed.

31. The system of claim 29 wherein said first transfer means is a vertical transfer pipe open to both the incinerating bed and the drying bed, means for injecting a stream of air into the lower end of said first transfer means to air lift hot bed sand from said incinerating bed to said drying bed and wherein said second transfer means is a vertical pipe open to both the incinerating bed and the dryer bed so that dried sludge and bed sand fall under the influence of gravity from the drying bed to said incinerating bed.

32. The system of claim 30 wherein said condenser comprises a tray scrubber which incorporates means for bringing water into contact with the moist air in said scrubber to condense the water vapor therein.

33. The system of claim 31 wherein said condenser comprises a tray scrubber which incorporates means for contacting the moist air in said scrubber with water to condense the water vapor therein.

* * * * *

UNITED STATES PATENT AND TRADEMARK OFFICE
CERTIFICATE OF CORRECTION

PATENT NO. : 4,159,682
DATED : July 3, 1979
INVENTOR(S) : Elliot B. Fitch et al

It is certified that error appears in the above—identified patent and that said Letters Patent is hereby corrected as shown below:

Claim 10, line 2, "claim 8" should raad -- claim 18 --.

Signed and Sealed this

Eleventh Day of December 1979

[SEAL]

Attest:

SIDNEY A. DIAMOND

Attesting Officer

Commissioner of Patents and Trademarks

REEXAMINATION CERTIFICATE (563rd)
United States Patent [19]
Fitch et al.

[11] B1 4,159,682
[45] Certificate Issued Sep. 16, 1986

[54] FLUID BED COMBUSTION WITH PREDRYING OF MOIST FEED USING BED SAND

[75] Inventors: Elliot B. Fitch, Pittsburgh, Pa.; Orris E. Albertson, Salt Lake City, Utah

[73] Assignee: Dorr-Oliver Incorporated, Stamford, Conn.

Reexamination Request:
No. 90/000,804, Jun. 18, 1985

Reexamination Certificate for:
Patent No.: 4,159,682
Issued: Jul. 3, 1979
Appl. No.: 856,379
Filed: Dec. 1, 1977

Certificate of Correction issued Dec. 11, 1979.

[51] Int. Cl.⁴ .................. F23G 5/00; F23G 7/00; F23G 5/04
[52] U.S. Cl. .................. 110/245; 110/216; 110/346
[58] Field of Search ............... 110/215, 216, 243, 244, 110/245, 254, 346, 224, 226, 104, 105; 432/15, 58

[56] References Cited
U.S. PATENT DOCUMENTS

| | | |
|---|---|---|
| 2,139,419 | 12/1938 | Moreton . |
| 2,169,160 | 8/1939 | Moreton . |
| 2,175,300 | 10/1939 | Moreton . |
| 2,175,301 | 10/1939 | Moreton . |
| 2,276,659 | 3/1942 | Kreisinger . |
| 3,306,236 | 2/1967 | Campbell ............... 110/216 |
| 3,625,165 | 12/1971 | Ishigari . |
| 3,702,595 | 11/1972 | Muirhead et al. . |
| 3,763,830 | 10/1973 | Robinson et al. ............. 110/215 |
| 3,779,181 | 12/1973 | Staffin et al. . |
| 3,815,522 | 6/1974 | Langer ................ 110/224 |
| 3,853,498 | 12/1974 | Bailie . |
| 3,907,674 | 9/1975 | Roberts et al. ............ 110/245 |
| 3,915,657 | 10/1975 | Staffin et al. ............ 110/245 |
| 3,954,069 | 5/1976 | Loken . |

FOREIGN PATENT DOCUMENTS

117271 of 1975 Japan .
1084977 9/1967 United Kingdom .

*Primary Examiner*—Edward G. Favors

[57] ABSTRACT

Moist combustible matter is burned in a fluid bed reactor following a drying treatment in which the combustible matter is brought into contact with hot sand circulated from the fluid bed reactor. The water in the combustible matter is evaporated at a relatively low temperature in the drying treatment, thereby conserving heat in the system. The exhaust vapor from the drying treatment is handled separately from the reactor exhaust gases to condense the vapor therein before subjecting the remaining gas to odor-destroying high temperature.

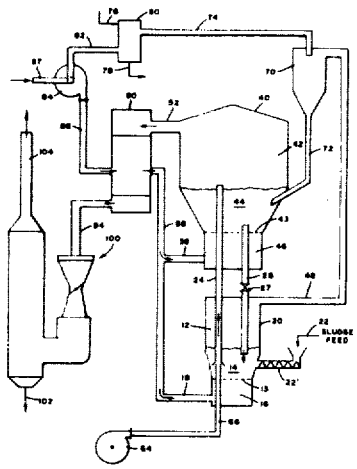

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 7, 11–13, 16–29, 32 and 33 are cancelled.

Claims 1, 8, 14, 30 and 31 are determined to be patentable as amended.

Claims 2–4, 6, 9, 10 and 15, dependent on an amended claim, are determined to be patentable.

1. A process for combustion of moist combustible feed wherein said moist feed is first dried and then introduced into a fluidized bed of hot, inert, particulate material for combustion comprising, withdrawing a quantity of said hot particulate material from said fluidized bed, intimately contacting said moist feed with said hot particulate bed material to evaporate the water in the feed at a [relatively low] temperature *in the range from 80° C. to 180° C. without any substantial addition of air*, separating the dried solids from the gas stream containing the evaporated water, charging the separated dried feed and the particulate bed material associated therewith into said fluidized bed for combustion, treating the separated gas stream to remove and dispose of the water vapor therein and forwarding the balance of the separated gas stream for further use in the process.

8. The process of claim [7] *3* wherein the fluidizing air for said fluidized bed is preheated by heat exchange with exhaust gas from said reactor.

14. A process for incineration of moist organic sludge wherein said moist sludge is first dried and then introduced into a reactor having a fluidized bed therein of hot, inert, particulate material to heat the sludge to *at least about 700° C. to effect* incineration [temperatures], comprising, withdrawing a quantity of said hot, particulate material from a fluidized incinerating bed to a drying zone, introducing moist sludge into said drying zone for intimate contact with said hot, particulate bed material to effect drying of said sludge *at a temperature in the range from about 80° C. up to about 180° C.* by evaporation of the water fraction *without any substantial addition of air*, conducting the water vapor away from said drying zone, condensing the water vapor and disposing of the liquid formed, exposing any non-condensible gases present in said drying zone to the odor-destroying elevated temperatures in said reactor, and charging the dried sludge and a quantity of particulate bed material into said fluidized incinerating bed for combustion of said sludge and reheating of said particulate bed material.

30. [The system of claim 29 wherein] *A combustion system for moist combustible feed comprising a fluidized bed reactor adapted to house a bed of inert particles, means for fluidizing said particle bed, an exhaust conduit connected to said reactor to conduct away reactor exhaust gases for ultimate discharge into the atmosphere, a dryer unit spaced from said fluidized bed reactor for drying moist feed prior to combustion, feed means connected to said dryer unit for introducing moist feed into said dryer unit, a first transfer means connecting said reactor of said dryer unit for withdrawing hot, inert, bed particles from said reactor and conveying said particles to said dryer unit, a second transfer means connecting said reactor and said dryer unit for withdrawing a mixture of dried feed and inert bed particles from said dryer unit and conveying said mixture to said reactor for combustion, a vapor conduit connected to said dryer unit for conveying water vapor from said dryer unit, a condenser connected to said vapor conduit to receive and condense said water vapor for disposal and means for conducting any non-condensible gas from said condenser to said reactor so that said non-condensible gas is subjected to the elevated temperature within said reactor,* said first transfer means is a vertical pipe open to both the incinerating bed and the dryer bed so that bed sand falls under the influence of gravity from the incinerating bed to said dryer bed and [wherein] said second transfer means is a vertical transfer pipe open to both the incinerating bed and the drying bed means for injecting a stream of air into the lower end of said second transfer means to air lift dried sludge and bed sand from said drying bed to said incinerating bed.

31. [The system of claim 29 wherein] *A combustion system for moist combustible feed comprising a fluidized bed reactor adapted to house a bed of inert particles, means for fluidizing said particle bed, an exhaust conduit connected to said reactor to conduct away reactor exhaust gases for ultimate discharge into the atmosphere, a dryer unit spaced from said fluidized bed reactor for drying moist feed prior to combustion, feed means connected to said dryer unit for introducing moist feed into said dryer unit, a first transfer means connecting said reactor of said dryer unit for withdrawing hot, inert, bed particles from said reactor and conveying said particles to said dryer unit, a second transfer means connecting said reactor and said dryer unit for withdrawing a mixture of dried feed and inert bed particles from said dryer unit and conveying said mixture to said reactor for combustion, a vapor conduit connected to said dryer unit for conveying water vapor from said dryer unit, a condenser connected to said vapor conduit to receive and condense said water vapor for disposal and means for conducting any non-condensible gas from said condenser to said reactor so that said non-condensible gas is subjected to the elevated temperature within said reactor,* said first transfer means is a vertical transfer pipe open to both the incinerating bed and the drying bed, means for injecting a stream of air into the lower end of said first transfer means to air lift hot bed sand from said incinerating bed to said drying bed and [wherein] said second transfer means is a vertical pipe open to both the incinerating bed and the dryer bed so that dried sludge and bed sand fall under the influence of gravity from the drying bed to said incinerating bed.

* * * * *